April 29, 1969  Z. KOVATS  3,440,877
TEMPERATURE COMPENSATING APPARATUS FOR FLUID FLOW METERS
Filed May 18, 1966  Sheet 1 of 5
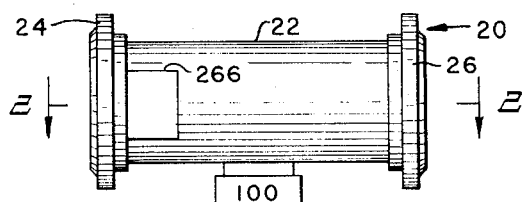
Fig. 1
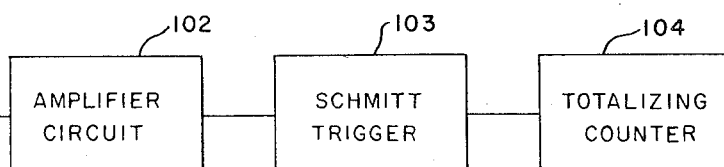
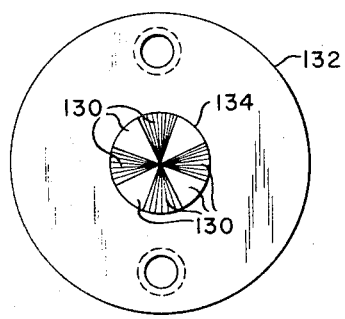
Fig. 5
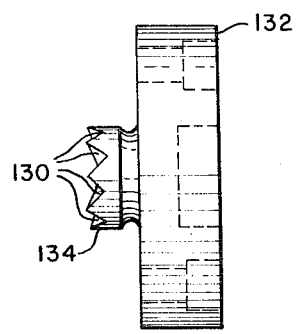
Fig. 6
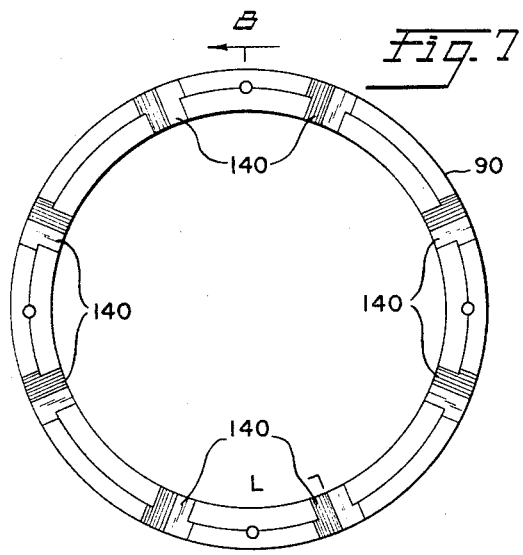
Fig. 7
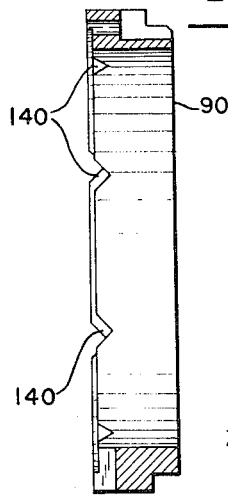
Fig. 8
INVENTOR
ZOLTAN KOVATS
BY Strauch, Nolan, Neale, Nies & Bronaugh
ATTORNEYS

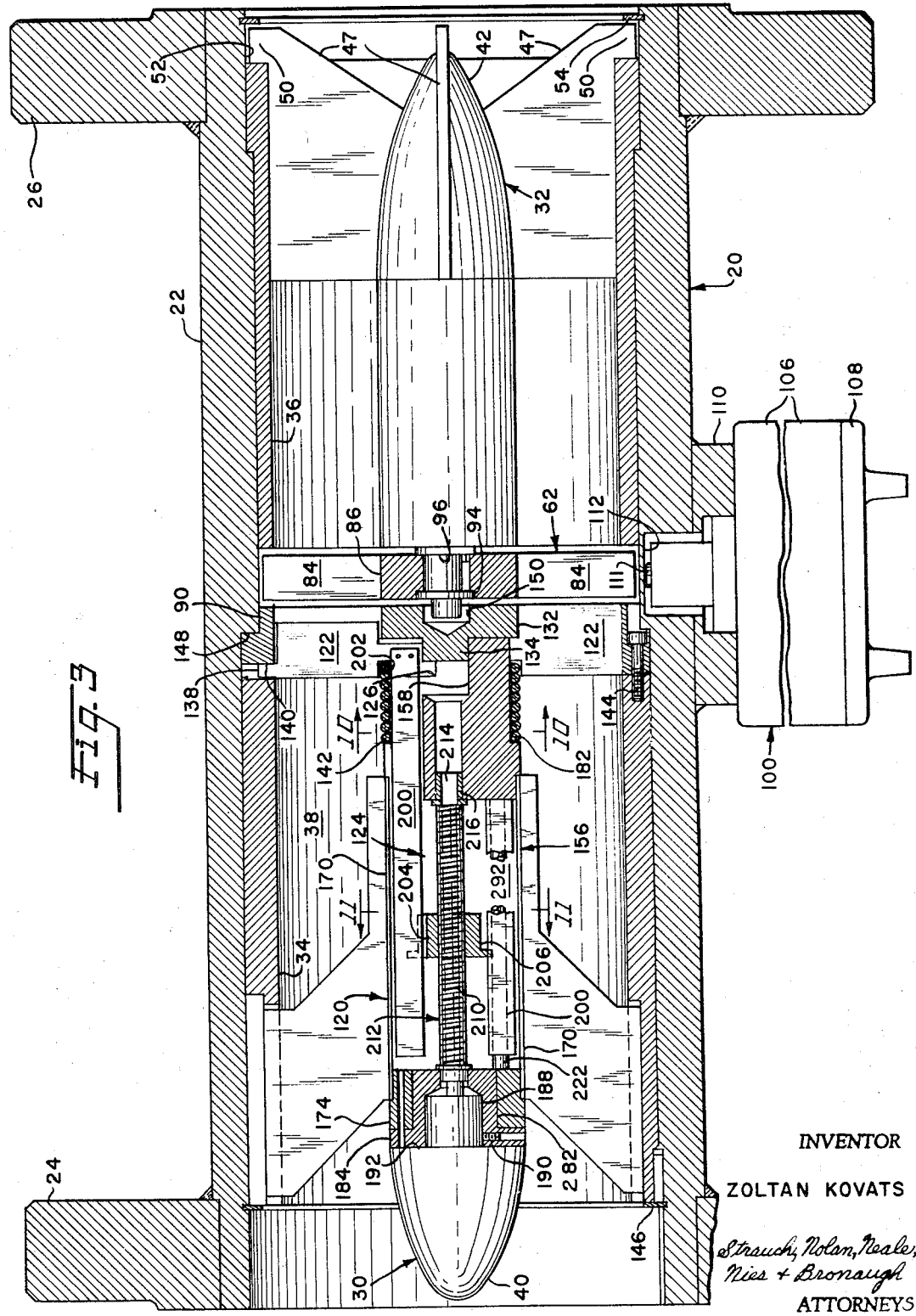

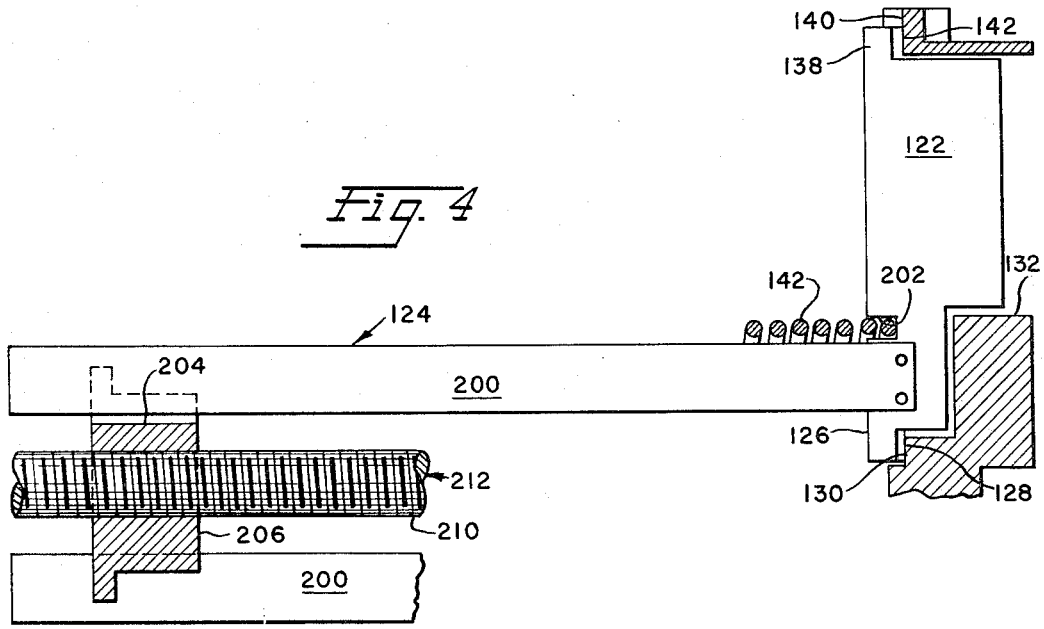
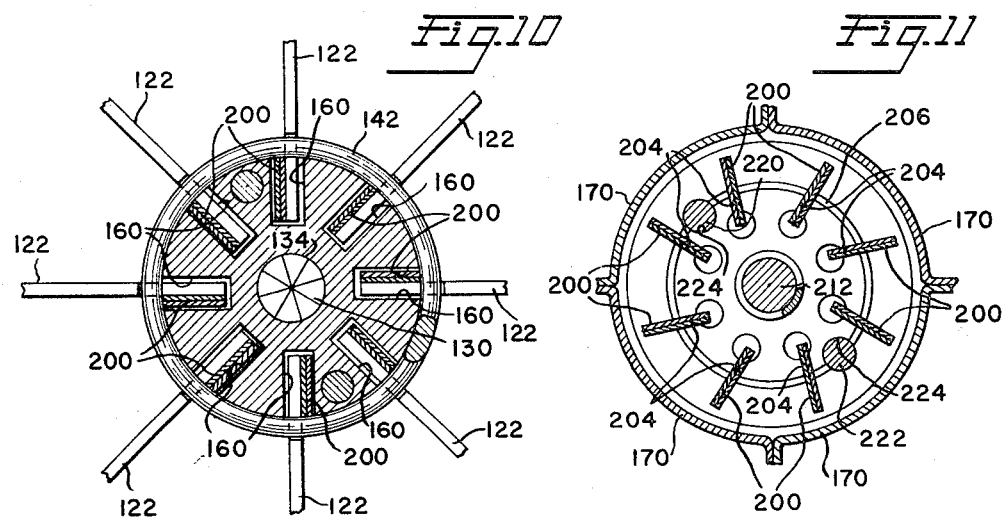
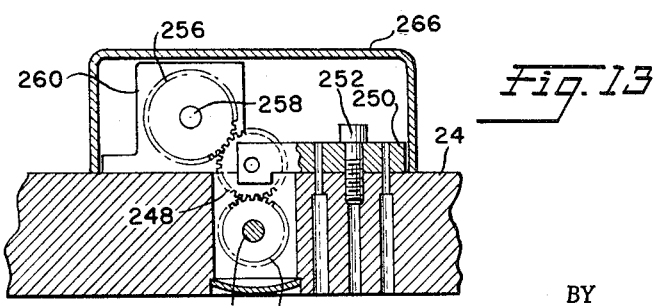

INVENTOR
ZOLTAN KOVATS

United States Patent Office 3,440,877
Patented Apr. 29, 1969

3,440,877
TEMPERATURE COMPENSATING APPARATUS
FOR FLUID FLOW METERS
Zoltan Kovats, Pittsburgh, Pa., assignor to Rockwell
Manufacturing Company, Pittsburgh, Pa., a corporation of Pennsylvania
Filed May 18, 1966, Ser. No. 551,121
Int. Cl. G01f 1/06
U.S. Cl. 73—230   22 Claims

ABSTRACT OF THE DISCLOSURE

A fluid flow meter temperature compensating apparatus comprising a plurality of pivotable flow deflecting guide vanes positioned by thermostatic elements to control the meter rotor velocity by controlling the direction of fluid flowing past the meter rotor blades in accordance with the temperature of the fluid being measured. The thermostatic elements each comprise a bi-metallic strip supported at one end by a sliding joint and secured at its other end to one of the flow deflecting vanes.

This invention relates to fluid flow meters and is particularly concerned with a novel temperature compensating apparatus for the type of volumetric flow meters having a fluid driven metering rotor which operates a register or ther like.

When fluid being measured by a volumetric flow meter is subject to temperature variations, it frequently is desirable to provide some form of temperature compensating apparatus for automatically correcting volumetric measurements to a reference temperature. In this way, the meter readings more accurately reflect the mass of fluid measured by the meter.

Turbine type flow meters which are used to measure fluid volume customarily comprise a bladed, turbine metering rotor which is rotated by fluid flow through the meter. The number of turns made by the metering rotor thus provides a measure of the fluid volume which passes the rotor blades. In small turbine meters (e.g., less than 6 inch pipe size), the fluid driven turbine rotors usually do not provide sufficient register drive torque to accommodate mechanical register drive trains especially when a temperature compensating device is connected in the drive train. As a result, it recently has become the practice to provide the smaller turbine meters with electronic read-out devices in place of the mechanical register and drive train to reduce mechanical friction and thereby improve the accuracy of the meter.

To provide turbine meters having electronic read-out devices with temperature compensation, it was the general practice, prior to this invention, to employ expensive and complicated electronic mechanisms or to obtain corrected fluid flow measurements by post facto calculations wherein the expansion coefficient is accounted for by an observer who records the temperature of the fluid periodically and then calculates a corrected reading from the reading on the electronic register. Some efforts have been made in the past to simplify the construction of temperature compensating devices for turbine meters, but the simplification typically has impaired the registration accuracy of the meter.

As its major object, the present invention provides for an improved automatic temperature compensating apparatus which is uncomplicated and which provides for highly accurate fluid flow measurements.

A more specific object of this invention is to provide a novel temperature compensating apparatus which delivers the fluid to the metering rotor with sufficient correction as to cause the metering rotor to accurately turn at a rate conforming to a reference or standard temperature. In this manner, an electronic pick-up device operatively associated with the metering rotor will produce the correct number of flow measurement pulses directly on read-out.

A more specific object of this invention is to provide a novel fluid meter temperature compensating device which has a plurality of flow deflecting vanes positionable by separate thermostatic elements to control the velocity of a fluid driven metering rotor.

Still another object of this invention is to provide a fluid meter with an improved temperature compensating device which has a simplified adjustment mechanism for selectively setting the volume expansion factor.

A further object of this invention is to provide an improved fluid meter temperature compensating device having flow deflecting vanes positioned by temperature responsive elements and a unique structure for supporting the assembly of the vanes and temperature responsive elements.

A further object of this invention is to provide for a novel fluid meter temperature compensating device having the advantages listed at the end of the detailed description herein.

Further objects of this invention will appear as the description proceeds in connection with the appended claims and annexed drawings wherein:

FIGURE 1 is a partially schematic elevation of an axial flow turbine meter containing a temperature compensating apparatus constructed according to this invention;

FIGURE 3 is a longitudinal section through the meter of FIGURE 1 as taken in a plane spaced 90 degrees from the plane of section 2—2;

FIGURE 4 is an enlarged fragmentary view of the temperature compensating structure as shown in FIGURE 3;

FIGURE 5 is a front elevation of one of the support members for the temperature compensating structure shown in FIGURES 2 and 3;

FIGURE 6 is a side elevation of the support member shown in FIGURE 5;

FIGURE 7 is a front elevation of a further support member for the temperature compensating structure shown in FIGURES 2 and 3;

FIGURE 8 is a section taken substantially along lines 8—8 of FIGURE 7;

Figure 2:
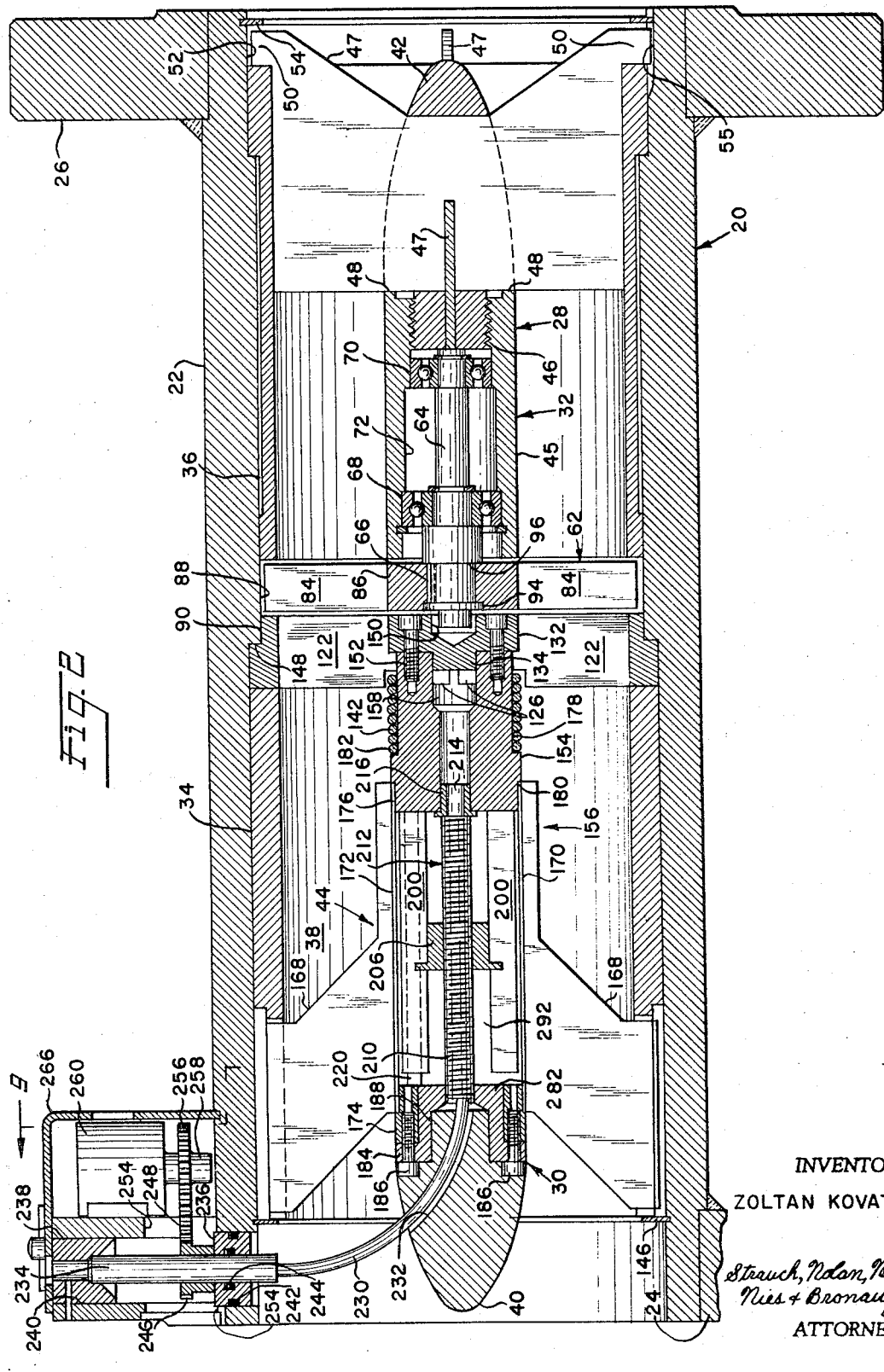
FIGURE 2 is a longitudinal section taken substantially along lines 2—2 of FIGURE 1.
Figure 9:
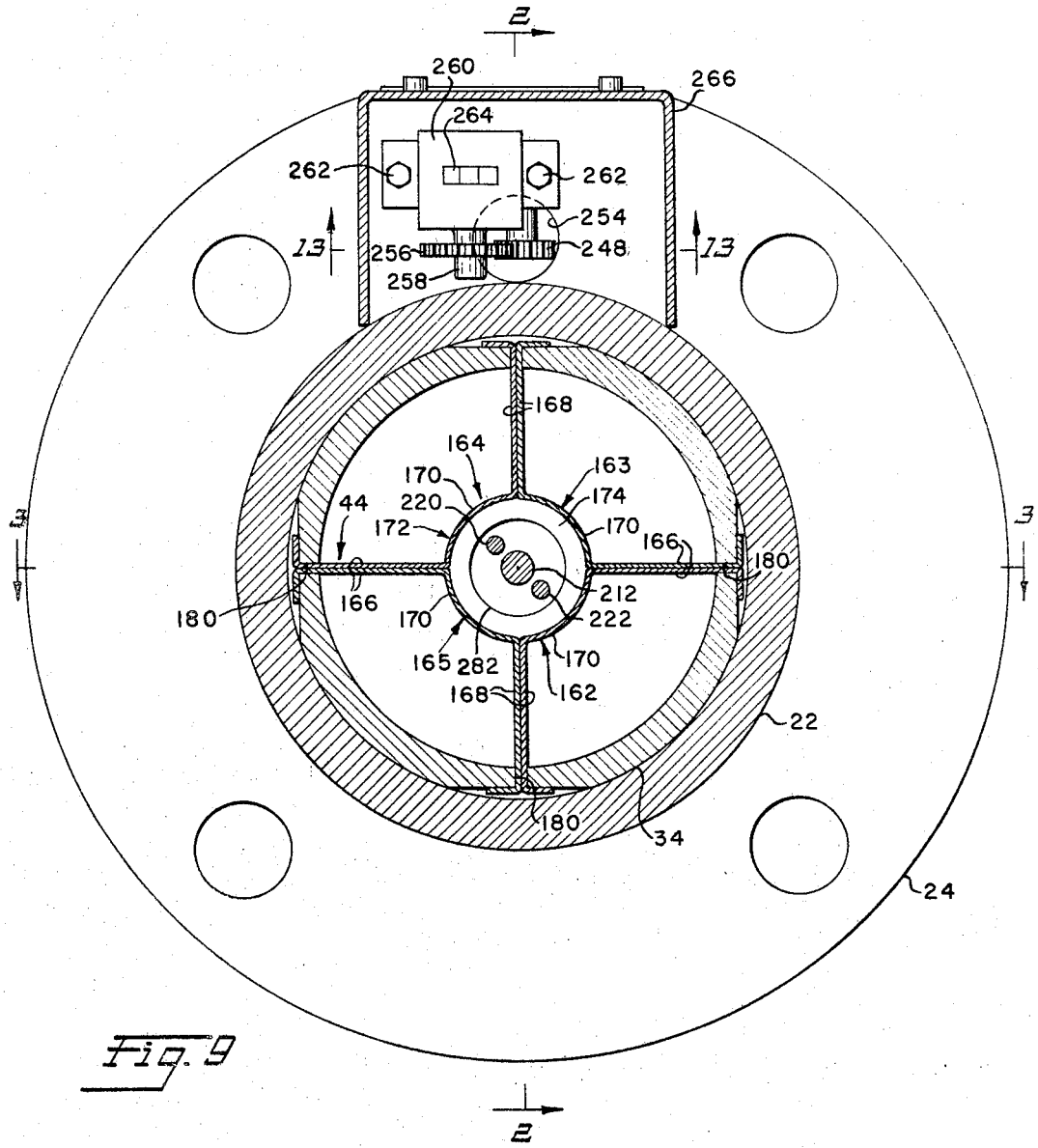
FIGURE 9 is a section taken substantially along lines 9—9 of FIGURE 2.
Figure 12:
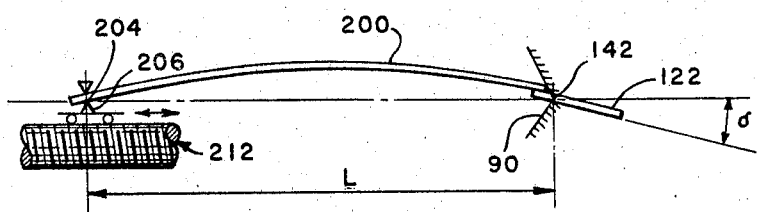

FIGURES 10 and 11 are sections respectively taken along lines 10—10 and 11—11 of FIGURE 3;

FIGURE 12 is a generally diagrammatic view of the temperature compensating structure shown in FIGURES 2 and 3; and FIGURE 13 is a section taken substantially along lines 13—13 of FIGURE 9.

Referring now to the drawings and more particularly to FIGURES 2 and 3, the reference numeral 20 generally designates an axial flow turbine meter incorporating the principles of this invention and comprising a metallic generally tubular housing 22 to which pipe attachment flanges 24 and 26 are fixed at opposite ends. Coaxially mounted in housing 22 is a fluid guide structure 28 comprising axially aligned, spaced apart faired cores 30 and 32 which respectively cooperate with coaxial sleeves 34 and 36 to form an annular fluid flow passage 38 extending between the inlet end of the meter at flange 24 and the outlet end of the meter at flange 26. All of the fluid flowing through the meter passes through passage 38.

With continuing reference to FIGURE 2, cores 30 and 32 are respectively provided with closed, faired noses 40 and 42 to provide a smooth divergence of fluid flowing into passage 38 and for a smooth convergence of fluid exiting from passage 38. Except for these faired ends, the diameters of the cylindrical peripheries of cores 30 and 32 are uniform and the same to cooperate with sleeves 34 and 36 for providing passage 38 with substantially uniformly diametered, coaxial inner and outer boundaries.

As shown in FIGURES 2, 3, and 9, core 30 is supported in sleeve 34 by a spider assembly 44 which will be described in detail later on.

Still referring to FIGURE 2, core 32 is generally of hollowed out configuration and comprises a tubular section 45. Nose 42 is provided with a threaded boss 46 that is securely received in a tapped bore coaxially formed in the downstream end of tubular section 45. The assembly of nose 42 and section 45 is supported in housing 22 by a pair of mutually perpendicular radially extending vane plates 47 which are respectively received with a snug fit in straight sided slots 48 formed in nose 42 and extending axially from the inner end of boss 46. Plates 47 are relatively thin and flat-sided and are formed with opposed, interengaging axially extending slots so as to be secured together in internested relationship.

Plates 47 extend radially from the cylindrical periphery of core 32 and are formed at their outer downstream ends with integral tabs 50 which slidably fit into a counterbored recess 52 formed in housing 22 radially inwardly of flange 26. Tabs 50 are axially confined between a groove-seated retainer ring 54 and the downstream end of sleeve 36 which is received in recess 52. At least one of the tabs 50 extends into a slot 55 in housing 22 to prevent the assembly of core 32 and plates 47 from rotating.

With continuing reference to FIGURE 2, a peripherally bladed turbine metering rotor 62 is non-rotatably fixed on a shaft 64 by a key 66. Shaft 64 extends coaxially into the upstream end of core 32 and is journalled in section 45 by axially spaced apart anti-friction ball bearing assemblies 68 and 70. Bearing assemblies 68 and 70 are coaxially received in a stepped bore 72 formed through section 45 and are confined against axial displacement by any suitable means.

Still referring to FIGURE 2, rotor 62 is provided with a plurality of equiangularly spaced apart straight blades 84 which are fixed to and extend radially from a rotor hub 86 at a predetermined angle to the longitudinal axis of the meter. Blades 84 are relatively long and extend completely across passage 38 and into an annular, uninterrupted inwardly opening recess 88. The opposed side walls of recess 88 are formed by the inner axially opposed ends of sleeves 36 and a bearing ring 90 and are contained in parallel planes extending at right angles to the rotational axis of rotor 62. Ring 90 and sleeve 36 are axially spaced apart so that the bottom wall of recess 88 is defined by the smooth, cylindrical, internal periphery of housing 22. With this construction, it is clear that recess 88 circumferentially surrounds rotor 62. Sufficient running clearance is provided between the bottom wall of recess 88 and the tips of rotor blades 84 which project into the recess.

As shown, rotor 62 is axially disposed between cores 30 and 32 and is axially confined between a retaining ring 94 and an annular shoulder 96 formed at the junction between diametrically stepped sections of shaft 64. Retainer ring 94 is carried by the upstream end of shaft 64.

Rotor blades 84 are magnetic and preferably made of stainless steel for a purpose to be described shortly. Hub 86, housing 22, flanges 24 and 26, and sleeves 34 and 36 are also preferably made of stainless steel, but of a non-magnetic type.

As shown in FIGURE 1, rotation of rotor 62 is detected by a pick-up unit 100 preferably comprising an inductor type signal transducer having output terminals electrically connected to the input of an amplifier circuit 102. The output of circuit 102 is electrically connected through a Schmitt trigger or squaring circuit 103 to the input of a conventional electrically actuated totalizing counter 104 of any suitable type. Pick-up unit 100, amplifier circuit 102 and trigger 103 may be of any suitable, conventional form, but preferably are the same as that described in copending application Ser. No. 348,153 (now Patent No. 3,301,053 issued on Jan. 31, 1967) filed on Feb. 28, 1964 for "Fluid Meter" and assigned to the assignee of this application.

As shown in FIGURE 3, pick-up unit 100 is exteriorly mounted on housing 22 and comprises an essentially cup-shaped, non-magnetic casing 106 having a cover 108. Casing 106 is suitably fixed to a mounting plate 110 which is secured to housing 22. Pick-up unit 100 has an operating core 111 which extends into an outwardly opening housing recess 112 and which is in radial alignment with rotor blades 84. With this arrangement, the tips of blades 84, which are magnetic, vary the flux density in core 111 when rotation is imparted to rotor 62 by flow of fluid through passage 38. In response to the flux density variations, an electrical voltage is induced into the inductance coil of pick-up unit 100. As a result, the transducer output will be a sinusoidal wave whose frequency and amplitude are directly proportional to the angular velocity of rotor 62. This undulating signal is fed to the input of amplifier circuit 102. The amplified output of circuit 102 fires trigger 103. The output of trigger 103, as is well known, is a square wave having a substantially constant amplitude. This signal is transmitted to actuate counter 104. The number of pulses emitted by trigger 103 is proportional to the number of revolutions made by rotor 62. The number of pulses generated by trigger 103 thus is closely proportional to the volume of the fluid which has passed through the meter.

In accordance with this invention a temperature compensating device 120 is provided to control the angular velocity of rotor 62 and hence the number of electrical pulses generated by trigger 103. Without such controlled rotation of rotor 62, the angular velocity of the rotor and, consequently, the number of pulses generated by trigger 103 will vary in response to temperature variations of the fluid being measured. The reason for this is that, at a given mass flow rate, the specific volume of the fluid changes with the fluid temperature, and changes in the specific volume produce corresponding changes in axial velocity of the fluid passing the rotor blades. Such changes in the fluid axial velocity result in corresponding variations in the rotational speed of the rotor.

The temperature compensator of this invention is shown in FIGURES 2 and 3 to comprise a series of eight equiangularly spaced apart, pivotally mounted, fluid flow deflecting vanes 122 and a temperature responsive positioning mechanism 124 for the vanes. Vanes 122 each comprise flat-sided thin plates radially spanning passage 38 on the upstream side of and immediately adjacent to rotor 62.

The purpose of vanes 122 is to change the velocity of fluid entering rotor 62 in a predetermined manner. Positioning mechanism 124, as will be explained in detail later on, is effective to so change the positions of vanes 122 that the number of revolutions made by rotor 62 is proportional in number to the volume that the measured fluid would have at a reference temperature such as 60° F. Trigger 103 therefore will generate pulses corrected to the reference temperature.

As best shown in FIGURES 3 and 4, vanes 122 are formed along their bottom edges with integral tabs 126. Tabs 126 extend radially inwardly and have their axially facing downstream edges beveled to define sharp knife edges 128. Knife edges 128 are seated in separate, axially and radially outwardly openings, V-shaped notches 130 formed in a knife edge support seat 132.

Seat 132, as best shown in FIGURES 5 and 6, comprises a peripherally smooth cylindrical member having a reduced diametered coaxial projection 134 extending axially upstream in axial alignment with the rotational axis of rotor 62. Notches 130, which are formed in the upstream end face of projection 134, are equiangularly spaced apart and extend radially from the longitudinal axis of seat 132 to align with and matingly receive knife edges 128.

As shown in FIGURES 3, 7, and 8, vanes 122 are integrally provided at their outer edges with radially outwardly extending tabs 138. Tabs 138 extend into aligning, V-shaped notches 140 formed in bearing ring 90. The axially facing downstream edges of tabs 138 are beveled to form sharp knife edges 142 which seat in notches 140.

Notches 140 radially align with notches 130 and open axially upstream to face the downstream end of sleeve 34. Tabs 138 extend between axially opposed surface faces of sleeve 34 and bearing ring 90 as shown in FIGURE 3. The tabs 126 and 138 on each vane 122 are contained in a common radial plane normally passing through the longitudinal axis of the meter.

A helically coiled spring 142, as will be described in greater detail later on, axially biases vanes 122 in a downstream direction to seat knife edges 128 and 142 in their respective notches 130 and 140. The knife edges 128 and 142 on each vane 122 are radially aligned. Each vane 122 is thus pivotable about a radial axis provided by a seating engagement of knife edges 128 and 142 in notches 130 and 140.

As shown in FIGURES 2 and 3, bearing ring 90 axially seats against the downstream end of sleeve 34. Cap screws 144 (one shown in FIGURE 3) fix sleeve 34 to ring 90. The assembly of sleeve 34 and ring 90 is axially confined between a retaining ring 146 and an annular shoulder 148. Shoulder 148 is formed at the juncture between stepped bore sections in housing 22, and ring 146 is seated in an inwardly opening groove formed in the upstream end of the housing.

The downstream end faces of bearing ring 90 and seat 132 are flat and contained in a common plane normally intersecting the rotor rotational axis at a short distance upstream from rotor 62. Seat 132 is coaxially formed with an axially opening blind bore 150 into which the upstream end of shaft 64 freely extends.

As shown in FIGURE 2, seat 132 is fixed by cap screws 152 to an end block 154 which forms a part of a housing assembly 156 for positioning mechanism 124. Projection 134 coaxially extends into a diametrically enlarged section of a stepped bore 158 which is formed through block 154 along an axis aligning with that of seat 132 and the rotational axis of rotor 62. Block 154, as best shown in FIGURE 10, is formed with radial slots 160. Tabs 126 freely extend through slots 160 and into bore 158 where knife edges 128 are seated in notches 130. Block 154 is coaxially supported in sleeve 34 by spider assembly 44 in a manner now to be described.

Referring to FIGURES 2 and 9, spider assembly 44 is shown to comprise a series of four members 162, 163, 164, and 165 preferably formed from stainless steel sheet. Each of the members 162-165 comprises a pair of mutually perpendicular plate sections 166 and 168 which are integrally joined together at their inner ends by an axially elongated arcuate section 170.

Sections 170 are disposed to define a sleeve 172 (FIGURES 2 and 3) about an axis aligning with the longitudinal axes of seat 132 and block 154. Sleeve 172 defines a part of housing assembly 156 and axially extends between block 154 and a collar 174.

As shown in FIGURES 2 and 3, block 154 is formed with a stepped cylindrical periphery to provide a raised annular land and reduced diametered end sections 176 and 178 which define axially, oppositely facing annular shoulders 180 and 182. Section 176 coaxially extends with a snug fit into the downstream end of the sleeve defined by spider sections 170. The ends of sections 170 axially butt against shoulder 180. Block 154 is thus supported by sections 170 and seat 132, in turn, is supported by block 154. Spring 142 peripherally surrounds section 178 and reacts against shoulder 182 to bias vanes 122 axially downstream to a position where knife edges 128 and 142 seat in notches 130 and 140 respectively.

As best shown in FIGURES 2 and 9, sections 166 and 168 seat against adjacent plate sections and radially extend in pairs through radial slots 180 formed in sleeve 34. The outer ends of sections 166 and 168 are bent laterally and are clamped between the opposed peripheries of sleeve 34 and housing 22. Spider members 162–165 are thus firmly secured in place.

As shown in FIGURES 2 and 3, collar 174 coaxially extends with a snug fit into the upstream end of the sleeve defined by sections 170 and has an annular shoulder which axially butts against the upstream edges of these sections. A guide collar 282 coaxially extends with a snug fit into collar 174 and has an integral radial flange 184 which seats against the planar, upstream end face of collar 174. Cap screws 186 extending through flange 184 rigidly secure collars 174 and 282 together.

Nose 40 is integrally formed with a reduced diametered, cylindrical end section 188 which is snugly received in collar 282. A set screw 190, which is threaded into a tapped radial bore in flange 184, seats against the periphery of end section 188 to secure nose 40 to collar 282. A radial shoulder 192 formed on nose 40 at the upstream end of end section 188 seats against the upstream end face of flange 184.

Collars 174 and 282, block 154, and spider sections 170 form housing assembly 156 and define a cylindrical compartment 292 in which the vane positioning apparatus 124 is received. The flush end faces of collars 174 and 282 delimit the upstream end of compartment 292 and are axially spaced from the axially opposed end of block 154 which delimits the downstream end of compartment 292.

The diameters of flange 184, the radially raised, exposed periphery of collar 174 between sections 170 and flange 184, the sleeve 172 defined by spider section 170, the raised land on block 154, the coil defined by spring 142, and seat 132 are substantially equal and, as such, provide a cylindrical extension of core 30.

Referring now to FIGURES 2–4, 10 and 11, the vane positioning mechanism 124 comprises a series of eight, thermostatic, flat-sided, bimetal strips 200 which are respectively fixed at corresponding ends one to each of the tabs 126 on vanes 122. Strips 200 are contained essentially in equiangularly spaced apart radial planes and axially and freely extend through slots 160 (see FIGURE 10) and into compartment 292. Spring 142 peripherally surrounds the assembly of strips 200 and seats at its downstream end in axially opening notches 202 (FIGURE 4) formed in vanes 122 at the juncture of tabs 126 with the fluid flow deflecting portions which radially span passage 38.

Some of the fluid flowing through the part of passage 38 which is upstream from rotor 62 passes through slots 160 and into compartment 292 where it contacts strips 200, causing their curvature to change in accordance with temperature variations. Additional heat is transferred between strips 200 and vanes 122 through their physical connection, thus assuring a rapid response to temperature variations by utilizing both direct and indirect heat convection.

Still referring to FIGURES 2–4 and 11, strips 200 slidably extend through aligning, radially outwardly opening slots 204 which are formed in an axially displaceable support collar 206. Support collar 206 thus provides a sliding support for strips 200 at a region which is axially remote and upstream from the regions where strips 200 are fixed to vanes 122. Slots 204 axially align with respective slots 160 in block 154.

As shown in FIGURES 2–4, collar 206 is threadedly mounted on a threaded section 210 of a rotatable support shaft 212. The rotational axis of shaft 212 aligns with that of rotor 62.

Shaft 212 is formed with a reduced diametered, cylindrically smooth end section 214 which is journalled in a flanged sleeve bearing 216. Bearing 216 is press fitted into a reduced diametered section of stepped bore 158. The opposite end of shaft 212 is journalled in collar 282. Shaft 212 is suitably confined against axial displacement.

To prevent rotation of collar 206 with shaft 212, a pair of cylindrical pins 220 and 222 (see FIGURES 9 and 11) are fixed at corresponding ends to collar 282 and extend in parallel relation to shaft 212 through arcuately bottomed, radially outwardly opening grooves 224 formed in collar 206. By preventing rotation of collar 206, rotation of shaft 212 will axially displace collar 206 through the threaded engagement of the tapped collar bore with shaft section 210.

The sub-assembly of each vane 122 and its respective bimetal strip 200, therefore, is supported at axially spaced apart regions by a sliding joint and a hinged joint as schematically illustrated in FIGURE 12. The sliding support joint is provided by engagement of each strip 200 with the edges of slots 204 in support collar 206. The hinged support joint is provided by the spring biased seating engagement of knife edges 128 and 142 in notches 130 and 140.

The behavior of each of the bimetal strips 200 is that its curvature varies with temperature. By mounting strips 200 in the manner shown in FIGURE 12, therefore, the rotation of each vane 122 about its pivot or hinge axis is represented by the angle δ and is linearly proportional to the temperature between the bimetal strip and a reference temperature (e.g. 60° F.).

The effective axial length between the sliding and hinged support joints mentioned above is marked by the dimension L in FIGURE 12. By rotating shaft 212, collar 206 is axially displaced to either increase or decrease the effective length L. Changing the length L in this manner varies the angular deflection of vanes 122 per degree of temperature change sensed by strips 200.

To effect rotation of shaft 212 from a region that is exterior of housing 22, a conventional, flexible shaft 230 (see FIGURE 2) is threaded at its inner end into a blind, tapped bore formed in the upstream end of shaft 212. Shaft 230 extends through an arcuately bottomed groove 232 formed in nose 40 and is threaded at its opposite end into a tapped blind bore which is formed in a shaft 234. Sleeve bearings 236 and 238 journal shaft 234 for rotation about an axis which is contained in a plane normally intersecting the rotational axis of shaft 212.

Bearings 236 and 238 are axially spaced apart and are fixed in a cylindrically smooth bore 240 radially formed through flange 24. As shown, the inner end of bore 240 opens into the upstream end of passage 38. Resilient, groove-seated, external and internal O-rings 242 and 244 carried by bearing 236 respectively provide annular fluid tight seals at the interface between the wall of bore 240 and the exterior of bearing 236 and the interface between shaft 234 and the interior of bearing 236. O-rings 242 and 244 thus prevent fluid from leaking through bore 240 to the exterior of housing 22. From this description, it will be appreciated that flange 24 provides a convenient housing for the assembly of shaft 234 and bearings 236 and 238.

As shown in FIGURES 2, 9, and 13, a gear 246 fixed to shaft 234 between bearings 236 and 238 constantly meshes with an idler gear 248. Idler gear 248 is rotatably supported by an arm 250 which is fixed to flange 24 by a machine screw 252. Gear 248 is supported by arm 250 in a lateral opening 254 which is formed in flange 24 and which communicates with bore 240.

Still referring to FIGURES 2, 9, and 13, a gear 256 constantly meshing with idler gear 248 is mounted on the drive shaft 258 of a direct drive counter 260. Counter 260 may be of any suitable conventional form having an unshown, manually manipulatable knob drive connected to selectively rotate shaft 258 in opposite directions.

Rotation of shaft 234 imparts rotation to shaft 258 through the drive connection provided by gears 246, 248, and 256. By rotating shaft 234, shaft 212 is rotated to thus axially advance collar 206 in opposite directions along shaft section 210. Axial displacement of collar 206, as previously explained, adjusts the amount of angular deflection of vanes 122 per degree of fluid temperature variation.

Counter 260 is suitably fixed to the downstream side of flange 24 by cap screws 262 (see FIGURE 9) and advantageously comprises an odometer having counter wheels with numbering which are visible through a window 264 (FIGURE 9) and which indicate the position of collar 206 on shaft 212. The numbering on the odometer thus provides a display of the volume expansion factor for which collar 206 is set. A suitable cover 266 for counter 260 may be fixed to housing 22.

In response to variations in the temperature of fluid flowing through the upstream portion of passage 38, the curvature of strips 200 change to thus correspondingly change the angular position of vanes 122. If the temperature of the fluid being measured should therefore vary from a predetermined reference value, the angular position of vanes are correspondingly changed to alter the direction of fluid entering rotor 62. The incidence of the fluid will be the same as the angular position of vanes 122 with respect to the rotor rotational axis because the fluid particles have a predetermined axial velocity before reaching vanes 122. Experiments verify that the angular change in the direction of fluid velocity is linearly proportional to the incidence of fluid to vanes 122.

As a result of changing the vectorial direction of fluid entering the rotor, the velocity at which rotor 62 is rotating will vary to thus vary the number of pulses produced by trigger 103 per unit volume of fluid measured. Analyses, verified by test results, demonstrate that the percentage of registration (at counter 104) changes linearly with the angular position of vanes 122. Test results further establish that highly accurate measurements are obtained with the temperature compensated meter of this invention, the error being as low as 0.02 percent of registration. The repeatability of the temperature compensated meter of this invention was found to fall within the limits of ±0.05 percent.

The advantages of the temperature compensating apparatus of this invention are as follows:

(1) It is reliable and highly accurate.
(2) It responds very quickly to temperature variations.
(3) Its manufacturing cost is low because its construction is uniquely simple.
(4) It does not require any maintenance.
(5) Its performance is not affected by even large temperature differences between fluid and ambient air owing particularly to the location of bimetal strips 200.
(6) It has an extremely long life since there are relatively few moving parts that are subject to wear.
(7) None of the parts can become misaligned during operation and as time elapses.
(8) The selectively set, volume expansion factor is displaced numerically by counter 260.
(9) No parts are required to be loosened or removed to reset the correction factor.
(10) The cost of parts such as strips 200 and vanes 122 is exceptionally low.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a fluid flow meter having a housing formed with inlet and outlet openings, a metering rotor rotatably supported in said housing to be driven by fluid flow therethrough and vane means mounted in said housing at a predetermined distance upstream from said rotor, said vane means being positionable to control the velocity of said rotor by controlling the angle of incidence which the fluid that enters the rotor makes with respect to said rotor, the improvement comprising temperature sensing means rigidly and abuttingly joined to said vane means and being responsive to variations in the temperature of fluid being metered to control the position of said vane means.

2. The fluid flow meter defined in claim 1 wherein said rotor is a bladed turbine rotor and wherein said vane means is mounted immediately upstream from said rotor blades for controlling the angle of incidence of fluid relative to said rotor blades.

3. The fluid flow meter defined in claim 2 wherein said temperature sensing means comprises thermostatic bimetal means engaging said vane means.

4. In a fluid flow meter having a housing formed with inlet and outlet openings, a metering rotor rotatably supported in said housing to be driven by fluid flow therethrough, and flow-deflecting vane means positionable in said housing to control the velocity of said rotor by controlling the angle of incidence which the fluid that enters said rotor makes with respect to said rotor, the improvement comprising coacting knife-edge and knife-edge seat means positioned on said vane means and a part rigid with said housing to provide a hinged support for said vane means, said hinged support enabling said vane means to be positioned for controlling the direction of fluid entering said rotor, and temperature sensing means fixed to said vane means, and being responsive to variations in the temperature of fluid being metered to control the position of said vane means.

5. In a fluid flow meter having a housing formed with inlet and outlet openings, a metering rotor rotatably supported in said housing to be driven by fluid flow therethrough, and vane means positionable to control the velocity of said rotor by controlling the angle of incidence which the fluid that enters said rotor makes with respect to said rotor, the improvement comprising temperature sensing means fixed to said vane means and being responsive to variations in the temperature of fluid being metered to control the position of said vane means, said temperature sensing means comprising thermostatic bimetal means engaging said vane means, and means providing spaced apart pivot and sliding joints for supporting the assembly of said vane means and said bimetal means, said vane means being swingable about a pivot axis provided by said pivot joint, said bimetal means being so engaged by said sliding joint that it is free to change its curvature in response to fluid temperature variations, and said bimetal means being effective by its temperature responsive change in curvature to swing said vane means about said pivot axis.

6. The fluid flow meter defined in claim 5 comprising means for selectively shifting said sliding joint relative to said pivot joint, the effect of shifting said sliding joint being to vary the angular displacement of said vane means per unit variation of temperature sensed by said bimetal means.

7. The fluid flow meter defined in claim 6 comprising a fluid guide structure mounted in said housing between said inlet and outlet openings and rotatably supporting said rotor, said bimetal means and said sliding joint being received in a space defined by said fluid guide structure.

8. In a fluid flow meter having a housing formed with inlet and outlet openings, a fluid guide structure mounted in said housings between said inlet and outlet openings, a metering rotor rotatably supported in said housing by said fluid guide structure to be driven by fluid flow through said housing, and vane means positionable to control velocity of said rotor by controlling the angle of incidence which the fluid that enters said rotor makes with respect to said rotor, the improvement comprising temperature sensing means fixed to said vane means and being responsive to variations in the temperature of fluid being metered to control the position of said vane means, said temperature sensing means comprising thermostatic bimetal means engaging said vane means and being mounted in said fluid guide structure.

9. The fluid flow meter defined in claim 3 wherein said vane means are mounted for pivotal displacement about an axis extending radially of the rotor rotational axis, the angular displacement of said vane means being at least closely, linearly proportional to the difference between the temperature of said bimetal means and a predetermined reference temperature.

10. In a fluid flow meter having a housing formed with inlet and outlet openings, a fluid metering rotor rotatably supported in said housing to be driven by fluid flow therethrough, and vane means positionable to control the angular velocity of said rotor by controlling the angle of incidence which the fluid that enters said rotor makes with respect to said rotor, the improvement comprising thermostatic bimetal means operatively connected to said vane means and being responsive to variations in the temperature of fluid being metered to control the position of said vane means, said bimetal means being mounted in said housing to extend substantially longitudinally with respect to the rotor rotational axis.

11. In a fluid flow meter having a housing formed with inlet and outlet openings, a fluid metering rotor rotatably supported in said housing to be driven by fluid flow therethrough, and vane means positionable to control the angular velocity of said rotor by controlling the angle of incidence which the fluid that enters said rotor makes wtih respect to said rotor, the improvement comprising thermostatic bimetal means operatively connected to said vane means and being responsive to variations in temperature of fluid being metered to control the position of said vane means, said vane means comprising a plurality of swingably mounted angularly spaced apart fluid flow-deflecting plates, and said bimetal means comprising a like plurality of bimetal elements respectively and independently connected one to each of said deflecting plates.

12. The fluid flow meter defined in claim 11, means coacting with said elements for selectively and unitarily adjusting the magnitude of displacement of said plates per unit variation in temperature of said elements.

13. In a fluid flow meter having a housing formed with inlet and outlet openings, a fluid guide structure mounted in said housing for defining a fluid flow passage between said openings, and a metering rotor rotatably supported by said fluid guide structure to be driven by fluid flowing through said passage, at least one flow-deflecting vane displaceably mounted in said housing at a predetermined distance upstream from said rotor, and at least one temperature sensing element subjected to the fluid being metered and being operatively connected to said vane for displacing said vane to control the angular velocity of said rotor in accordance with variations in the temperature of the fluid being metered from a predetermined reference temperature, said temperature sensing element being mounted in said core structure.

14. In a fluid flow meter having a housing formed with inlet and outlet openings, a fluid guide structure mounted in said housing and defining a fluid flow passage between said openings, and a metering rotor rotatably supported by said fluid guide structure to be driven by fluid flow through said passage, the improvement comprising temperature compensating means including a temperature sensing element in said core structure for controlling the angular velocity of said rotor in accordance with variations in the temperature of the fluid being metered from a predetermined reference temperature, said means controlling the velocity of said rotor further comprising a flow deflecting vane pivotally mounted for swinging movement about an axis extending radially of the rotor rotational axis, said vane being disposed immediately upstream from said rotor and being operatively connected to said element to be swung about its pivot axis for controlling the angle at which the fluid approaches said rotor.

15. In a fluid flow meter having a housing formed with fluid inlet and outlet openings and a fluid metering rotor rotatably supported in said housing to be driven by fluid flow therethrough, the improvement comprising vane means positionable to control the angular velocity of said rotor by controlling the angle of incidence which the fluid that enters said rotor makes with respect to said rotor, means sensing the temperature of fluid being metered for controlling the position of said vane means, and means providing spaced apart hinged and sliding joints solely supporting the assembly of said vane means and said temperature sensing means.

16. In a fluid flow meter having a housing formed with inlet and outlet openings and a bladed fluid metering rotor rotatably supported in said housing, the improvement comprising a plurality of angularly spaced apart fluid flow deflecting vanes formed separately of said rotor and each independently swingable about axes extending radially of the rotor rotational axis for controlling the angular velocity of said rotor by controlling the angle of incidence which the fluid that enters said rotor makes with respect to said rotor, and a like plurality of elements independently operatively connected one to each of said vanes and being responsive to the temperature variations of fluid being metered to so control the positions of their associated vanes that the number of rotor revolutions is closely proportional to the volume that the measured fluid would have at a predetermined reference temperature.

17. The fluid flow meter defined in claim 16 wherein said elements are fixed to their associated vanes.

18. The fluid flow meter defined in claim 17 comprising a fluid guide structure mounted in said housing and having axially spaced apart core sections defining a flow passage of annular cross section for directing fluid in an annular stream into, through and beyond said rotor, means rotatably supporting said rotor between said core sections, a shaft having a threaded section journalled in one of said core sections for rotation about an axis aligning with the rotor rotational axis, a member threaded on said shaft and having radial openings through which said elements slidably extend to be supported by said member, coacting knife-edge and knife-edge seating means respectively positioned on said vanes and said housing and providing a pivotal support for each of said vanes, means preventing rotation of said member with said shaft, means for selectively rotating said shaft to axially displace said member relative to the assembly of said elements and said vanes to thereby vary the distance between said member and said pivotal support, the effect of varying said distance being to adjust the amount of angular displacement of said vanes per degree of temperature variation sensed by said elements.

19. In a fluid flow meter having a housing formed with inlet and outlet openings, and a fluid metering rotor rotatably supported in said housing to be driven by fluid flow therethrough, displaceable vane means positionable in said housing to control the angular velocity of said rotor by controlling the angle of incidence which the fluid that enters said rotor makes with respect to said rotor, and temperature sensing means mounted in said housing and being responsive to temperature variations of fluid being metered to control the position of said vane means, the improvement comprising means including a member selectively displaceable within said housing along the rotor rotational axis for adjusting the amount of displacement of said vane means per degree of temperature variation sensed by said temperature responsive means.

20. The fluid flow meter defined in claim 19 comprising means disposed exteriorly of said housing for selectively displacing said member along its axis, and means exteriorly of said housing for providing an indication of the adjusted position of said member.

21. The fluid flow meter defined in claim 20 wherein said housing is provided with pipe connection flanges, and wherein said means for selectively displacing said member comprises a motion-transmitting shaft and means journalling said shaft in a bore formed in one of said flanges.

22. The fluid flow meter defined in claim 10 wherein said vane means comprises a plurality of vanes each pivotably mounted for rotation about an axis extending radially of the rotor rotational axis.

References Cited

UNITED STATES PATENTS

| | | | |
|---|---|---|---|
| 1,015,552 | 1/1912 | Gamon | 73—230 |
| 1,185,736 | 6/1916 | Trood | 73—230 |
| 2,699,678 | 1/1955 | Gehre. | |
| 2,791,118 | 5/1957 | Holtz | 73—233 |
| 2,974,525 | 3/1961 | Cole. | |
| 2,961,874 | 11/1960 | Granberg | 73—230 |
| 3,060,740 | 10/1962 | Granberg | 73—230 |
| 3,248,945 | 5/1966 | Karlby et al. | 73—231 |
| 2,870,634 | 1/1959 | Gehre | 73—230 |

FOREIGN PATENTS 942,113  11/1963  Great Britain.

RICHARD C. QUEISSER, *Primary Examiner.*

EDWARD D. GILHOOLY, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,440,877                      April 29, 1969

Zoltan Kovats

It is certified that error appears in the above identified patent and that said Letters Patent are hereby corrected as shown below:

Column 1, line 28, "ther" should read -- the --. Column 12, line 7, cancel "and", second occurrence.

Signed and sealed this 14th day of April 1970.

(SEAL)
Attest:

Edward M. Fletcher, Jr.              WILLIAM E. SCHUYLER, JR.
Attesting Officer                        Commissioner of Patents